Inventor:
Heinz Fleissner
By Dickey & Craig
ATTORNEYS

United States Patent Office

3,445,947
Patented May 27, 1969

3,445,947
PROCESS AND DEVICE FOR DRYING AND IRONING TOWS AND OTHER STRANDS OF MATERIAL OR SLIVER-TYPE MATERIAL
Heinz Fleissner, Frankfurt, Germany, assignor to Anstalt fur Patentdienst, Vaduz, Liechtenstein
Filed Jan. 28, 1966, Ser. No. 523,730
Claims priority, application Germany, Jan. 28, 1965, A 48,256
Int. Cl. D06f 61/04, 65/10, 67/00
U.S. Cl. 38—2
30 Claims

ABSTRACT OF THE DISCLOSURE

Method and apparatus for drying and ironing endless filament groups and other strands of material which utilizes a drying chamber including a plurality of cylindrical conveying means, at least one of which is a sieve drum and another of which is a heated calender roll. The various conveying means are disposed within the drying chamber in such a manner that each is in contact with the material being treated over a substantial portion of its peripheral surface, thus effecting a stretching or ironing of the material. The drying of the material is effected by a combination of evaporation of the liquid from the material by contact heat conduction between the heated calender rolls and the material with evaporation of moisture by means of circulating currents of a treatment medium through the sieve drums.

---

The present invention relates to a process and a device for drying and ironing preferably tows or endless filament groups and other strands of material or silver-type material, in which device the material is passed over rotating cylinders in a drying chamber, heated to the drying temperature, and dried by means of a treatment medium.

It is known to use so-called calender dryers for drying tows. In general, those calender dryers consisting of a drying chamber in which a number of polished, hollow copper cylinders are arranged, the interior of which is heated by means of steam over which cylinders the tows are passed. The cylinders are generally driven in such a way that the peripheral speed is increased from cylinder to cylinder toward the discharge side. However, it is also possible to decrease the peripheral speed from cylinder to cylinder.

In such devices, surface drying is effected. However, not all parts of the material, for example of the top, are dried uniformly; rather the fibers at the two surfaces of the material are dried more quickly, stretched and thus ironed, since these fibers are in direct contact with the polished, hot copper cylinders.

This process is generally termed ironing. Owing to the non-uniform drying also the ironing effect is unequal, i.e., the outer fibers which are in direct contact with the copper cylinders are not only dried better but also ironed better than the filaments in the interior of the tows.

In order to limit the required number of heated cylinders, the individual cylinders are heated to relatively high temperatures. Already in the case of normal operation, the fibers which are in direct contact with the cylinders, are exposed to the danger of being overheated and damaged. However, the main danger to the tows lies in the unavoidable downtimes of the device caused by disturbances or failures in the treatment devices connected in front of or behind the dryer, i.e., connected upstream or downstream of the dryers. In order to avoid damage to the individual filaments and/or tows in the case of such down-times, the prior art device would have to be emptied each time before it is stopped. With the known calender dryers this is, however, undesirable because threading of the tows into the device is difficult and time-consuming.

The capacity of the prior art installations is furthermore decreased by a layer of steam existing between cylinder and material which layer of steam is generated by evaporation of the liquid present in the material and which inhibits the heat transfer between cylinder and material. For that reason, the heat capacity is much lower in the case of contact drying than in the case of convection, the amounts of heat required for drying in the latter case being supplied to the material to be dried by means of a gaseous drying medium.

Drying in the known sieve drum dryers is of great advantage. In the case of such sieve drum dryers, the individual sieve drums are subjected to a suction draft by means of a radial fan at the end face of the drum so that the material to be dried is simultaneously held onto the sieve drum jackets by the suction draft.

Owing to the suction draft, air is passed through the material which air has been previously guided over a heating device and thus has been heated up. By the fact that the heated drying air is passed through the material, uniform drying of all filaments of, for example, the textile material is achieved. However, up to now it has not been possible to obtain the ironing effect in the known sieve drum dryers. In order to obtain an ironing effect in sieve drum dryers, a special design is required in which the speed of rotations of the individual sieve drums can be infinitely adjusted. The individual artificial or synthetic fibers might shrink by varying amounts during drying which shrinkages cause differing tensile strains that might even result in breaking of the tows. The speed of rotation of the individual drums must be adjusted in such a way that allowance is made for the respective degree of shrinkage of the material. In some cases, however, a certain tensile strain is to be maintained by means of which stretching and thus consolidation of the artificial fibers and a good smoothing and/or ironing effect is obtained at the same time.

Shrinkage varies greatly depending on the type of artificial or synthetic fibers. In case of polyester fibers, shrinkage amounts, for example, to 8% approximately and in the case of polyacryl tow, shrinkage amounts even to 17 to 20% depending on the pretreatment.

In the case of calender dryers, adjustment of the speed of rotation of the individual calender rolls for the individual materials is not necessary since the material may slide on the calender rolls in conformity with the degree of shrinkage. Owing to the frictional forces between tow and calender rolls, sufficient stretching and thus consolidation and smoothing of the tows is also obtained.

The known sieve drum dryers work with large quantities of air which are circulated in a closed housing and which are sucked through the material. However, there are also materials, such as plastic foils or tows which are impermeable to air or permeable to air only to a very limited degree. In the case of those materials, only very small quantities of air can be sucked through the material. In order to obtain a better drying capacity, the sieve drums are only partially covered with the material to be dried. Thus, relatively large quantities of the treatment medium may pass that portion of the sieve drum which is not covered by the material. That part of the air circulates around the material to be dred, and part of the heat is radiated to the material. At the same time, it heats up the sieve drum so that also contact heat transfer is effected. The evaporated liquid is immediately sucked off by the suction draft in the sieve drums. A layer of steam between drum jacket and material which would inhibit the heat transfer can, therefore, not be formed.

The present invention has as its object to avoid the disadvantages of the aforementioned processes in a simple way and to ensure at the same time, uniform and economical drying of the tows as well as possibly an ironing effect.

In accordance with the present invention, this task is solved by a process and a device of the kind described hereinabove, in which the material is heated by means of contact heat transfer, as already known in itself, and by means of a gaseous treatment medium, preferably drying air, and in which the evaporated liquid is led off or conducted away by means of the treatment medium which is circulated around and/or passed through the material. In the case of materials which are to be smoothed and/or stretched during drying, it is of advantage to pass the treatment medium through the material and to smooth the material and/or to keep it under longitudinal tension during at least one drying stage, preferably by gliding friction by means of cylinders.

Preferably the drying stage during which the material, preferably the tow, is to be smoothed is provided at that time and/or at that point where the tows shrink most during drying. For carrying out the process of the present invention, a device with a drying chamber having rotating cylinders for guiding the material as well as a means for circulating the treatment medium may be provided which device is characterized by the joint use and arrangement of the known sieve drums subjected to a suction draft or an excess pressure and of calender rolls as guiding cylinders for the material. For purposes of the rapid drying of the material, one or several sieve drums subjected to a suction draft may be arranged at the intake of the device which is or are followed by a treatment stage with calender rolls. In that treatment stage the material may simultaneously shrink insofar as this is possible owing to the stretching effect of the calender rolls. Since, as already mentioned in the beginning, uniform drying is not possible on calender rolls, the treatment stage with the calender rolls is preferably followed by a conditioning or end-drying zone at the discharge end of the device in which zone again sieve drums subjected to a suction draft or an excess pressure are used. In the case of tows which, in a wet condition, are hardly permeable to air, it is of advantage to dry and stretch the tows on calender rolls first and to dry the tows uniformly on sieve drums afterwards.

It is of special advantage, if, in accordance with another object of the present invention, at least one sieve drum and at least two calender rolls are arranged alternately. Thus, a good air circulation is effected in the treatment chamber, and the drying air will circulate around and will be passed through the tows and/or the material at the calender rolls. The layer of steam formed on the calender rolls by the liquid evaporating out of the material is led off thereby. Heat transfer from the calender roll to the material, which might be impaired by a layer of steam, is thus not inhibited. Since the steam is constantly led off, the drying capacity is considerably larger.

Furthermore, it is suggested that the second and possibly further calender rolls of each unit rotate at a higher peripheral speed than the preceding one in order to obtain an ironing effect. The subsequent sieve drum may then again rotate at a slightly lower speed so that a relaxation of the tows may take place between the last calender roll of the preceding unit and the sieve drum of the following unit.

An especially simple and space-saving constructing results if, according to the present invention, sieve drums with a small perforation are used and if the sieve drums are provided with a suction device. It is, therfore, advantageous to rate the suction draft in such a way that a sliding friction, i.e., a sliding of the tows on the sieve drums is still possible, so that the tows cannot break while they shrink during final drying and that, at the same time, a stretching and ironing of the tows is effected by the sliding of the tows and by the tensile forces caused by the frictional forces of the tows on the sieve drums. In such a device no special calender rolls have to be used in addition. In order to increase the drying effect even further and in order to keep the device smaller and/or to decrease the number of sieve drums, a device for heating up, preferably for the additional heating up of the sieve drums may be arranged within the sieve drums or also outside the sieve drums.

For example, instead of or in addition to the usual baffle plates for interrupting the suction draft along that portion of the sieve durm which is not covered by the material, radiation heating devices may be arranged inside or outside the sieve drums. Any other arrangement of the radiating means is, however, also possible. The sieve drum jacket is heated up by this radiation heat and an additional drying of the tows is effected by the contact heat of the heated sieve drum jacket. The liquid evaporated as a result of the contact heat is sucked off together with the drying air by the suction draft in the sieve drums. This device excels by an extremely high efficiency. As compared with the known devices, it may be constructed very small and it works extremely economically.

According to another object of the present invention, it is possible to use a device which is only equipped with calender rolls as guiding elements for the tows and to construct the device essentially smaller and make it essentially more economical than the known calender dryers and to obtain a fairly uniform drying effect with that device, by providing that calender dryer with a housing and by subdividing the interior of the housing into a treatment chamber in which the rolls, i.e., preferably the calender rolls, for guiding the material are arranged and into a further chamber in which a device for circulating the treatment medium such as drying air, is arranged. In that device the calender rolls are preferably arranged in the treatment chamber in two superposed rows which do not contact each other. The bottom of the treatment chamber may, for example, form at the same time the partition wall to the chamber having the air circulating device. In that case the bottom is provided with outlet openings the size of which corresponds to that of the exhaust connections of the fan wheels. The fan wheels which are arranged in the chamber below the treatment chamber suck drying air out of the treatment chamber. The air sucked off thereby passes the individual tows and while being returned into the treatment chamber, the air is passed over a heating unit, preferably steam-heated tubes, and heated up so that overdried air enters the upper end of the treatment chamber which air is then passed anew through the material. The circulation of the drying air and the constant heating up during each circulation cycle ensures an extremely economical operation and, at the same time, uniform drying. The material may simultaneously slide on the calender rolls in conformity with its shrinkage so that also here any breaking of the tows is avoided. The desired stretching effect and thus the ironing effect is obtained by the sliding friction of the tows on the calenders which, at the same time, means a consolidation of the filaments.

In that device, the fan chamber may also be arranged adjacent to the treatment chamber, similar to the known sieve drum dryers. In that case only an intermediate suction chamber is required out of which the fan wheels suck the air. This intermediate suction chamber is connected with the lower part of the treatment chamber and sucks the air out of the same.

An increase of the capacity is obtained in a simple way and in accordance with another object of the present invention with a device in which jet and suction units are correlated to the calender rolls and in which there is a common chamber which is preferably arranged at the side of the rolls which common chamber is subdivided by at least one fan into a suction area and a pressure area. In such a device the jet units are connected with the pressure area and the suction units are connected with the suction area of the chamber. Since the chamber is required for the fans appertaining to the sieve drums, that chamber is generally provided in a device which is equipped with sieve drums as well as with calender rolls. In the case of such a construction, the device is not larger than heretofore by using the design of the present invention.

Furthermore a device with sieve drums arranged preferably in one row is of advantage in which calender rolls are arranged at the free sides of the sieve drums; for example, in the case of sieve drums arranged in one horizontal row, the calender rolls are arranged above and below the sieve drums. Such a device according to the present invention offers the advantage that the calender rolls are arranged within the range of the flowing treatment medium, preferably of the drying air, which is circulated by means of the fan arrangement appertaining to the sieve drum.

Analogous to a device with sieve drums arranged in one horizontal row, this object of the instant invention can also be applied to a device with at least two superposed sieve drums subjected to a suction draft. In that case, one row of superposed calender rolls is provided at both sides of the sieve drums, which calender rolls are again arranged within the flow range of the treatment medium.

In the case of materials which do not tend to break and thus to form laps and according to another object of the present invention, the calender rolls are arranged relative to the sieve drums in such a way that a treatment zone on a sieve drum follows after each heating-up zone on a calender roll, in which treatment zone the steam layer, evaporated on the calender roll, on the material and in the material, is sucked off so that on the next following calender roll an intense heat transfer between roll and textile material is again possible. With such a device the material can be dried extremely rapidly and economically.

It is further of advantage if the calender rolls are covered with a wire mesh and/or surrounded with a wire mesh cover so that the steam layer which inhibits the heat transfer is interrupted and/or bridged by that wire mesh. A similar effect is obtained if the calender rolls have a grooved surface or a similar surface.

For automatic threading of the tows in the aforedescribed devices, wheel disks may be provided at the side of the sieve drums and the calender rolls which wheel disks serve for guiding wheel straps or plastic straps. A connecting strip may be fastened to those straps. The straps are driven independently of the sieve drums and the calender rolls; the drive may be coupled with a guide roll.

These and further objects, features and advantages of the present invention will become more obvious from the following description when taken in connection with the accompanying drawing which shows, for purposes of illustration only, several embodiments in accordance with the present invention and wherein.

Figure 1:
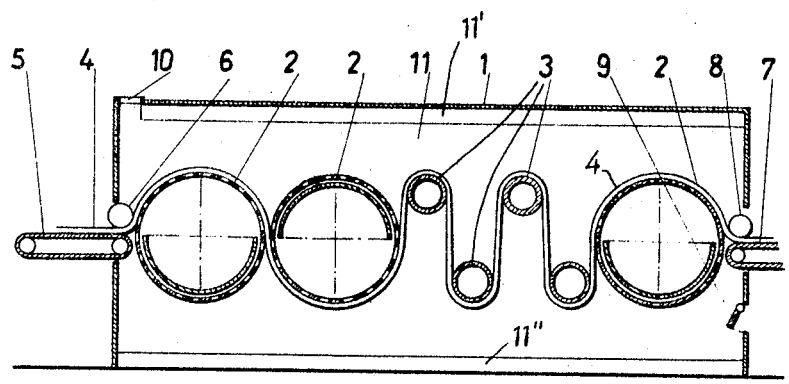
FIGURE 1 is a somewhat schematic longitudinal cross-sectional view of a drying and ironing device in accordance with the present invention provided with sieve drums and calender rolls.

Referring now to the drawing, wherein like reference numerals are used throughout the various views to designate like parts, the device according to FIGURE 1 consists of a housing 1 with sieve drums 2 subjected to a suction draft at the intake of the device and calender rolls 3 as well as of a sieve drum 2 at the discharge end of the device. Material 4 to be dried and ironed is fed to the first sieve drum 2 by means of a conveyor belt 5 and a roll 6. The material 4 is guided on the sieve drums 2 at a relatively high speed and part of the liquid adhering to the material is removed. Further drying during which a great amount of shrinkage takes place, for example, of tow during drying, is effected on the steam-heated calender rolls 3. These calender rolls 3 are preferably driven in such a way that the next following calender roll rotates each time at a higher speed than the preceding one. In the case of materials with a high degree of shrinkage it is, however, also possible that the speed of the individual calender rolls is decreased and that nevertheless the textile material, for example, the tows slide on the rolls 3 and that the tows are stretched between the individual rolls.

A uniform drying and/or a conditioning of the material 4 is obtained by means of the sieve drum 2 at the discharge end of the device since the already overdried material absorbs some moisture and since the filaments in the interior of for example the tows which still have a relatively high moisture content give off some moisture. The material is discharged from the treatment chamber by means of a conveyor belt 7 and a roll 8.

The air exchange in the device will preferably be effected according to the counter-current principle, i.e., fresh air is sucked in through an opening 9 which can be adjusted by a flap in the end face at the discharge end of the device whereas the air enriched with moisture is discharged through an opening 10 at the intake end of the device. In the device of FIGURE 1, the drying air is circulated several times by means of conventional fan wheels (not shown) which are arranged laterally of the sieve drums and which create the suction draft before it is discharged at the intake of the device through the opening 10. Since the drying air is used several times for drying the tows, the device works extremely economically.

Figure 4:
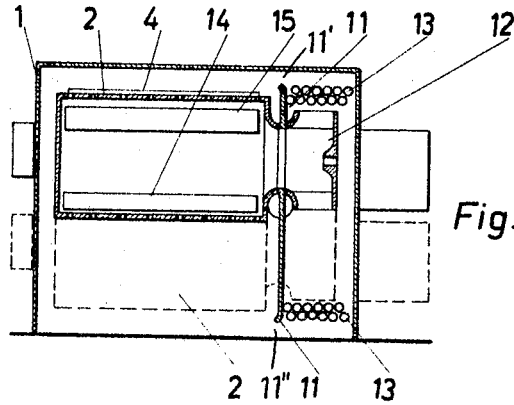
FIGURE 4 is a transverse cross sectional view through the device of FIGURE 3, taken along line IV—IV of FIGURE 3.

The treatment chamber is separated from the fan chamber by a longitudinal partition wall 11. The fan chamber (not shown) which is disposed laterally of the treatment chamber, and the treatment chamber are, however, connected at the top and at the bottom by way of openings 11' and 11'' formed between the partition wall 11 and the housing 1 so that the air which has been sucked out of the sieve drums and which has been heated up by means of heating units 13 which are arranged in the fan chamber (FIG. 4) may flow back into the treatment chamber.

Figure 2:
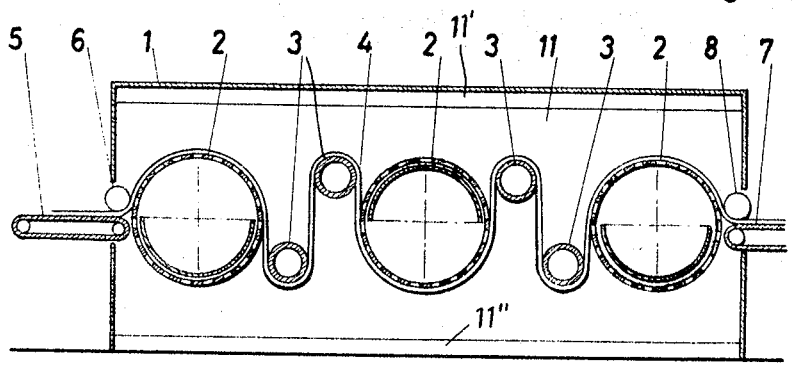
FIGURE 2 is a somewhat schematic longitudinal cross sectional view similar to FIGURE 1 through a modified embodiment of a drying and ironing device in accordance with the present invention.

The construction of the device according to FIGURE 2 is similar to that of the device according to FIGURE 1, it differs only by the arrangement of sieve drums 2 and calender rolls 3. At the intake of the device a sieve drum 2 is arranged, two calender rolls 3 follow and then again a sieve drum 2 and two calender rolls 3. Several of these units, sieve drum and two calender rolls, and/or a suitable number of these units may be arranged one behind the other. Again a sieve drum 2 is arranged at the discharge end of the device. The individual units may also consist of several sieve drums 2 and more than two calender rolls 3. The sieve drum and the following calender roll of each unit may be driven at approximately the same peripheral speed whereas the calender roll following the first calender roll rotates at a slightly higher peripheral speed in order to obtain a good stretching effect and thus a good ironing effect. The sieve drum which follows that calender roll rotates again at a slightly lower peripheral speed so that allowance is made for a relaxation of, for example, the tows between the preceding calender roll and the sieve drum. In general, the peripheral speed of the individual sieve drums will be decreased in the direction of material passage according to the shrinkage of the tows.

Figure 3:
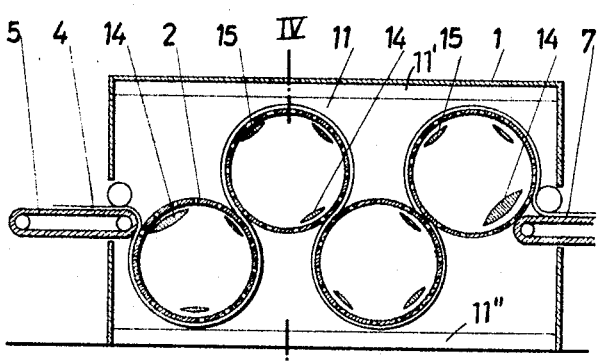
FIGURE 3 is a somewhat schematic longitudinal cross sectional view through a further modified embodiment of a drying and ironing device in accordance with the present invention provided only with sieve drums.

An especially advantageous embodiment of a device according to the present invention is shown in FIGURE 3. Also with this device the interior of a housing 1 is subdivided in the known way into a treatment chamber with sieve drums 2 subjected to a suction draft and into a fan chamber (FIG. 4) by a partition wall 11. The sieve drums 2 of this device have a preferably small perforation as compared with the known sieve drums in the known sieve drum dryers, i.e., these sieve drums are provided with essentially smaller holes for the air penetration and/or with essentially fewer holes per unit of area. Also, the capacity of the fans 12 is smaller than with the known sieve drum dryers. The suction draft of fans 12 is preferably adjusted in such a way that the tows are allowed to slide on the sieve drums during drying which sliding is caused by the shrinkage of the material. Possibly also the speed of the individual sieve drums 2 may be increased in the direction of material passage so that an ironing effect is obtained by the sldinig of the tows on the perforated sieve drum jackets. Owing to the slight air circulation and thus air penetration through the tows, the drying capacity would normally be lower than that of the known sieve drum dryers. However, according to the present invention, the drying capacity can be essentially increased by arranging conventional heat-radiation units 14 and 15 within the sieve drums and/or also outside the sieve drums instead of the baffle plates or in addition to the conventional baffle plates, which radiation units heat up the sieve drums so that the contact heat causes an evaporation of the liquid out of the tows similar as with the calender dryers. This device thus works extremely economically and is very simple and small in construction so that the workshops which are usually limited in space and in which the devices are erected, are as much as possible reserved for the treatment devices connected in front of and behind this device. A particularly favorable drying effect is furthermore achieved with this device if that portion of the sieve drums which is not covered by the material to be treated is not covered completely by radiation heating units 14 but if part of the sieve drum jacket remains free for the penetration of the treatment air so that a relatively large amount of air is circulated and the air absorbs a large amount of heat in a heating unit 13. The evaporated moisture is constantly led off by the suction draft so that with this device a steam layer which would inhibit heat transfer cannot be formed.

Of course, it is also possible to dry the tows or any other material to be dried without any tension. In the aforementioned device this can be done in a simple way by feeding the material to the sieve drums and/or at least to the first sieve drum with a certain amount of overfeed and/or by having each subsequent sieve drum rotating at a slower speed than the preceding one.

Figure 5:
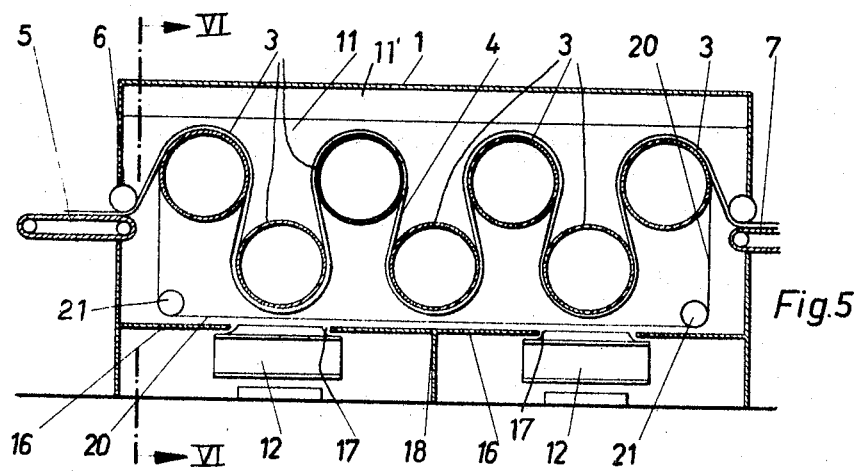
FIGURE 5 is a somewhat schematic longitudinal cross sectional view through another modified embodiment of a drying and ironing device in accordance with the present invention provided with calender rolls.
Figure 6:
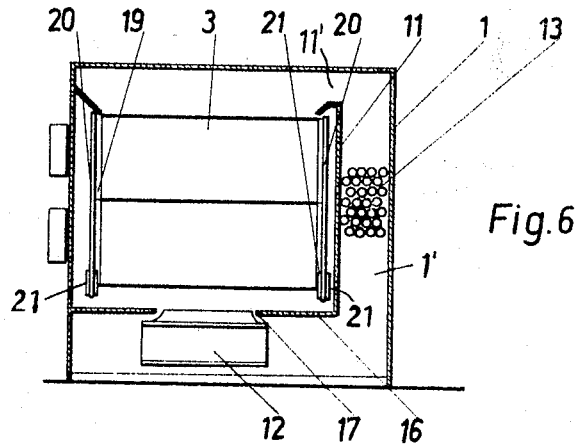
FIGURE 6 is a somewhat schematic transverse cross sectional view through the device of FIGURE 5, taken along line VI—VI of FIGURE 5.

In the device according to FIGURES 5 and 6, exclusively calender rolls 3 are used for guiding the tows through the treatment chamber. In order to obtain also here a uniform drying by means of the drying air circulating around the tows and penetrating the tows, the treatment chamber in which the calender rolls are arranged is limited by a bottom 16 which is provided with openings 17 for the flow therethrough of the drying air sucked off by fan wheels 12. Depending on the length of the device, several fans 12 can be arranged one behind the other as seen in the direction of material passage. In order to avoid disturbing air turbulence, the individual fans are separated from each other by walls 18. The air sucked out of the treatment chamber is returned into the treatment chamber at the upper end 11′ thereof by way of a lateral chamber 1′ (FIG. 6) in which a heating unit 13, usually steam-heated tubes, is arranged as may be gathered from FIGURE 6.

In order to enable a rapid starting up of this device, a special take-in or threading device for the automatic feeding and passage of the material through the device has been provided. The take-in or threading device consists of wheel disks 19 (FIG. 6) which are arranged laterally to the calender rolls 3 and which can be moved independently of the calender rolls; straps 20, preferably metal straps or also plastic straps or the like are passed over the wheel disks 19. When starting up the device, the tow ends are fastened to a connecting strip and the connecting strip is fastened to straps 20 arranged at both sides of calender roll 3. The tows pass the treatment chamber together with the connecting strip. At the discharge end the connecting strip is then removed. For purposes of providing an improved feeding and discharging of the connecting strip and of the tow ends into and/or out of the treatment chamber, rollers 6 and 8 at the intake and at the discharge end of the device are mounted so as to be adjustable. The endless straps 20 are additionally guided on rolls 21. One of these rolls 21 may be provided with a conventional drive for feeding the tows.

Figure 7:
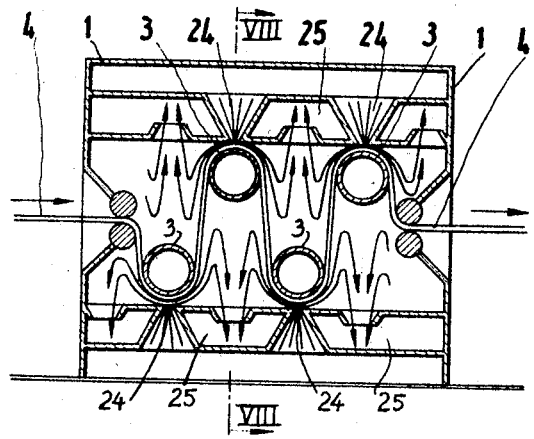
FIGURE 7 is a somewhat schematic longitudinal cross sectional view through a still further modified embodiment of a drying and ironing device in accordance with the present invention utilizing calender rolls and jet units.
Figure 8:
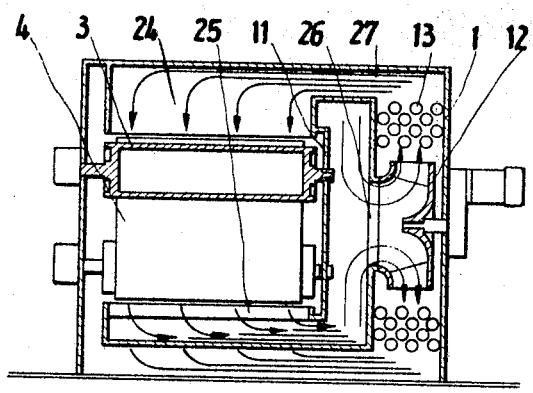
FIGURE 8 is a somewhat schematic transverse cross sectional view of the device illustrated in FIGURE 7, taken along line VIII—VIII of FIGURE 7.

In the device according to FIGURES 7 and 8, calender rolls 3 are provided for the transportation of the material 4. This device can be used exclusive of or in combination with sieve drums 2 subjected to a suction draft. A fan 12 (FIG. 8) is provided to the side of the end face of calender rolls 3 for conducting away the liquid evaporated from material 4, which fan is separated from the calender rolls by a front partition wall 11 and which fan circulates a treatment medium, preferably drying air. Nozzle-like jet units 24 are provided above and below the calender rolls 3 which jet units accelerate the treatment air circulated by the fan 12 so that the air flows against the material 4 at a high speed. The air is sucked off by way of suction units 25. The suction units 25 are connected with a common suction area 26; the drying air is sucked by the fan 12 out of the common suction area 26 and is blown into a pressure area 27 which is connected with the jet units 24. This device offers the advantage that the air is blown intensely onto the material 4 through the jets 24. With the arrangement of the fan 12 as shown, which arrangement corresponds to that in a sieve drum dryer, it is possible to combine the drying compartments shown in FIGURES 7 and 8 with drying compartments used in connection with sieve drums subjected to a suction draft without the necessity of any constructional changes.

Figure 9:
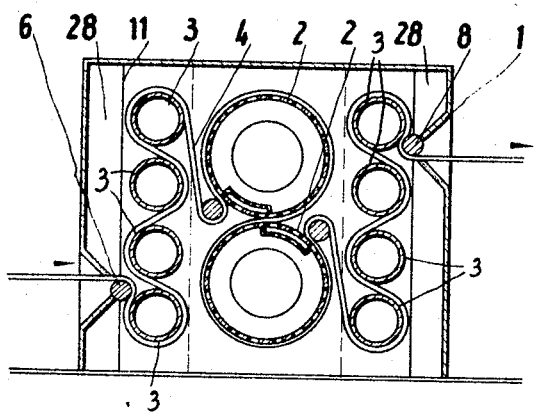
FIGURE 9 is a somewhat schematic longitudinal cross-sectional view through a still further modified embodiment of a drying and ironing device in accordance with the present invention utilizing calender rolls in front and behind the sieve drums.

FIGURE 9 shows a particularly efficient, space-saving device. In the device of FIGURE 9, two sieve drums 2 are arranged one above the other and the angle of grip of the material around the sieve drums, i.e., the angle of engagement of the material with the sieve drums is very large. Calender rolls 3 are arranged in a vertical row on both sides of these sieve drums 2. Material 4 is heated up on the calender rolls 3 provided at the intake and part of the moisture is evaporated on those rollers 3. Afterwards, the thus-produced steam is completely sucked-off on the sieve drums 2 and the material 4 is further dried on the sieve drums by means of drying air which is sucked through the material. Finally, the material is again dried on a vertical row of calender rolls 3 which provide the material with a smoothing and calendering effect. A conventional fan device (not shown) for circulating the treatment air is arranged at one end face of the sieve drum 2. A partition wall 11 between sieve drum 2 and fan device 12 may project beyond the calender rolls 3 so that a free or unobstructed cross section 28, through which the air enters the chamber containing the sieve drums 2 and the calender rolls 3, lies in the free space between calender rolls 3 and wall of the housing 1. The air sucked off by the sieve drums 2 circulates around the calender rolls 3 and leads off or conducts away part of the evaporated moisture. As indicated by the dashed line, the front partition wall may, in the alternative, be substantially smaller and may terminate in the space between sieve drums 2 and calender rolls 3. In that case the air flowing back into the treatment chamber flows axially along the calender rolls 3 before it is sucked in by the sieve drums 2. A more uniform air distribution is achieved by reason of the larger cross section for the air penetration.

Several of these units may be arranged one behind the other. Also it is possible to combine two or several superposed sieve drums with a number of calender rolls arranged in one vertical row.

Figure 10:
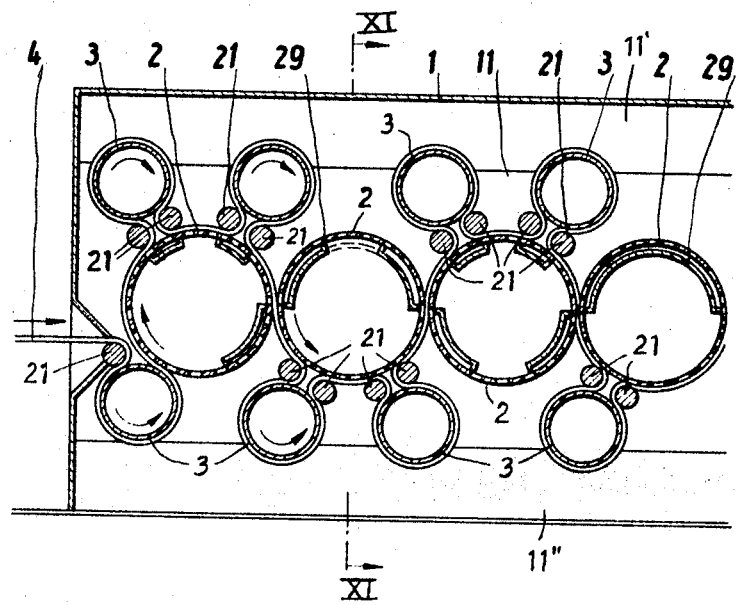
FIGURE 10 is a somewhat schematic longitudinal cross sectional view through another modified embodiment of a drying and ironing device in accordance with the present invention utilizing calender rolls coordinated to each sieve drum.
Figure 11:
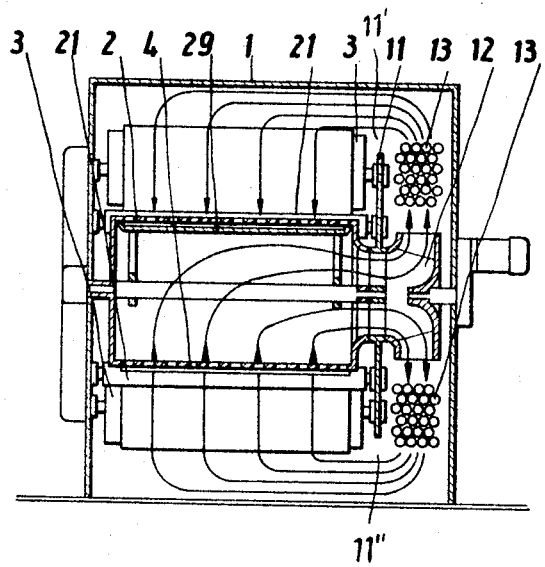
FIGURE 11 is a somewhat schematic transverse cross sectional view through the device of FIGURE 10 taken along line XI—XI of FIGURE 10.

For materials which are only slightly or hardly permeable to air and which do not tend to form laps, the use of a device according to FIGURES 10 and 11 is of advantage. In that device sieve drums 2 are arranged in a horizontal row and within a closed housing 1, which sieve drums are subjected to a suction draft by means of fan wheels 12 which are arranged laterally thereof. The suction draft may be partly or completely interrupted by means of baffle plates 29 provided within and along those portions of the sieve drums 2 which are free from material. If only a small amount of air can pass through the material to be dried, it is expedient to subject part of the portion of the sieve drum 2 free from material to a suction draft as well so that the air may be sucked through that free part and may be circulated thereby more readily.

Owing to a larger quantity of circulated air, the device works more economically and also the heat transfer from a heating unit 13 to the circulated drying air is more favorable. In the device of FIGURES 10 and 11, sieve drums 2 are correlated to calender rolls 3. In general, the material is guided over deflector rollers 21 when being passed from sieve drum to calender roll and from calender roll to sieve drum. The arrangement of the calender rolls shown in FIGURE 10 offers the advantage that each heating-up of the material on a calender roll 3 is followed by a suction zone on a sieve drum 2, in which zone the evaporated liquid can be sucked off the material so that an intense heat exchange is ensured during the subsequent contact between material and calender roll.

In the case of tow, top and similar materials which tend to form laps on the calender rolls and deflector rollers, it is, furthermore of advantage to provide these rolls and possibly also the sieve durms with a nonadhesive or only slightly adhesive coating, i.e., with a coating which prevents sticking of these materials to the rolls, for example, with a Teflon coating.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. An apparatus for drying and ironing materials which comprises a substantially closed housing, a plurality of cylindrical conveying means, including at least one sieve drum means and at least one calender roll means, rotatably disposed within said housing, each of said cylindrical conveying means contacting the material being treated over substantially half of the periphery thereof, inlet means for introducing the material to be treated to said conveying means, fan means disposed within said housing for circulating a gaseous treatment medium in said housing, additional means for heating said calender roll means, and outlet means for removing the treated material from the apparatus, said apparatus thus serving to effect evaporation of the liquid contained in the material being treated.

2. The apparatus of claim 1, wherein the cylindrical sieve drum means are provided with heating means within the circulation of the treatment medium.

3. The apparatus of claim 2, wherein at least one calender roll means is disposed at the inlet of the apparatus.

4. The apparatus of claim 3, wherein at least one calender roll means is disposed at the outlet of the apparatus.

5. The apparatus of claim 2, wherein at least one sieve drum means is disposed at the inlet of the apparatus and at least one sieve drum means is disposed at the outlet of the apparatus.

6. The apparatus of claim 5, wherein a series of alternating units of calender roll means and sieve drum means are disposed between the inlet and outlet sieve drums.

7. The apparatus of claim 6, wherein the alternating unit of calender roll means contains at least two of such roll means.

8. The apparatus of claim 1, wherein the housing is provided with an opening near the outlet means for the introduction of fresh air and an opening near the inlet means for the removal of moist air.

9. The apparatus of claim 8, wherein the opening near the outlet is provided with a swivel flap.

10. The apparatus of claim 1, wherein said sieve drum means contains small perforations in the surfaces thereof and are provided with small capacity fan means to permit the material being treated to slide along the surfaces of the sieve drum means during drying.

11. The apparatus of claim 10, wherein heating means are provided inside at least some of said sieve drum means.

12. The apparatus of claim 10, wherein heating means are provided on the outside of at least some of the sieve drum means.

13. The apparatus of claim 11, wherein the heating means are radiation-heating units formed by baffle plate 14. The apparatus of claim 12, wherein the heating means are radiation-heating units formed by baffle plate means.

15. The apparatus of claim 1, wherein said sieve drum means are subjected to a suction draft and arranged in one row and calender roll means are disposed at the free sides of the sieve drum means.

16. The apparatus of claim 15, wherein said sieve drum means are arranged in one horizontal row and the calender roll means are arranged at the top and at the bottom of respective sieve drum means.

17. The apparatus of claim 1, wherein said conveying means include calender roll means covered with a wire mesh.

18. The apparatus of claim 1, wherein said conveying means include calender roll means provided with a grooved surface.

19. The apparatus of claim 1, wherein said conveying means include calender roll means provided with a nonadhesive coating.

20. The apparatus of claim 19, wherein said coating is Teflon.

21. The apparatus according to claim 1, further comprising partition means for separating the housing into a treatment chamber containing said cylindrical conveying means and a fan chamber containing the fan means for circulating the treatment medium, additional partition means forming a third chamber disposed laterally of said cylindrical conveying means, said third chamber comprising a pressure zone containing nozzle-like jet units and a suction zone containing suction uints, said units operatively communicating with said cylindrical conveying means, said third chamber also communicating with said fan chamber where said fan means sub-divides and directs the treatment medium to and from said pressure zone and said suction zone.

22. The apparatus of claim 1, further comprising partition means for separating the housing into a treatment chamber containing said cylindrical conveying means and a fan chamber containing the fan means for circulating the treatment medium, additional partition means forming a third chamber disposed laterally of said cylindrical conveying means, said third chamber comprising a pressure zone containing nozzle-like jet units and a suction zone containing suction units, said units operatively communicating with said cylindrical conveying means, said third chamber also communicating with said fan chamber where said fan means sub-divides and directs the treatment medium to and from said pressure zone and said suction zone.

23. The apparatus of claim 1, wherein said sieve drum means are subjected to a suction draft and arranged in one row and calender roll means are disposed at the free sides of the sieve drum means.

24. The apparatus of claim 23, wherein at least two sieve drum means are arranged in one vertical row and said calender roll means are arranged in vertical rows on both sides of the sieve drum means.

25. The apparatus of claim 24, wherein the angle of engagement of the material being treated with the sieve drum means is very large.

26. The apparatus of claim 23, wherein said sieve drum means are arranged in one horizontal row and the calender roll means are arranged at the top and at the bottom of respective sieve drum means.

27. A process for drying and ironing continuous filaments of materials which comprises introducing the material to be treated into a drying chamber, conveying said material in said chamber over cylindrical conveying means including at least two heated calender roll means and sieve drum means subjected to a suction draft, each of said calender roll means being rotated at a higher peripheral speed than the preceding one, said material contacting a substantial portion of the peripheral surface of each of said cylindrical conveying means, heat treating said material by contact heat transfer with the heated surfaces of said conveying means and by the circulation of a heated gaseous treatment medium in said housing, and removing the evaporated liquid by means of said treatment medium, whereby an ironing of the material is achieved in part by the shrinkage of the material being treated which causes said material to at least partially slide on the calender roll means in conformity with the degree of shrinkage and further, by the friction forces between the material and the calender roll means which provide sufficient stretching and smoothing of the material.

28. The process of claim 27, wherein the treatment medium circulates around the material being treated and penetrates through said material.

29. The process of claim 28, wherein said calender roll means are followed by sieve drum means which rotate at a slower peripheral speed than the calender roll means, thus providing for a relaxation in the material being treated.

30. The process of claim 28, wherein the material being treated contacts at least half of the peripheral surface of each of said cylindrical conveying means.

References Cited

UNITED STATES PATENTS

| 2,922,229 | 1/1960  | Kiefer    | 34—115   |
| 3,149,004 | 9/1964  | Fleissner | 34—115 X |
| 3,197,896 | 8/1965  | Fleissner | 34—115 X |
| 1,007,137 | 10/1911 | Palmer    | 38—14    |
| 2,753,766 | 7/1956  | Simpson   | 34—115 X |
| 3,098,371 | 7/1963  | Fleissner | 34—115 X |

KENNETH W. SPRAGUE, *Primary Examiner.*

U.S. Cl. X.R.

34—23, 115